US010513187B2

(12) United States Patent
Guggisberg et al.

(10) Patent No.: US 10,513,187 B2
(45) Date of Patent: Dec. 24, 2019

(54) CONVERTER SYSTEM FOR ELECTRICALLY DRIVING A VEHICLE

(71) Applicant: ABB Schweiz AG, Baden (CH)

(72) Inventors: Beat Guggisberg, Untersiggenthal (CH); Beat Ronner, Würenlos (CH)

(73) Assignee: ABB Schweiz AG, Baden (CH)

(*) Notice: Subject to any disclaimer, the term of this patent is extended or adjusted under 35 U.S.C. 154(b) by 469 days.

(21) Appl. No.: 14/945,039

(22) Filed: Nov. 18, 2015

(65) Prior Publication Data

US 2016/0144723 A1 May 26, 2016

(30) Foreign Application Priority Data

Nov. 20, 2014 (EP) .................................... 14194190

(51) Int. Cl.
*B60L 9/24* (2006.01)
*B60M 3/00* (2006.01)
(Continued)

(52) U.S. Cl.
CPC ................. *B60L 9/24* (2013.01); *B60L 50/40* (2019.02); *B60L 50/50* (2019.02); *B60L 50/53* (2019.02);
(Continued)

(58) Field of Classification Search
CPC ........ B60L 9/24; B60L 11/18; B60L 11/1803; B60L 11/1811; B60L 11/1812; B60L 11/1814
See application file for complete search history.

(56) References Cited

U.S. PATENT DOCUMENTS 7,521,138 B2 * 4/2009 Pearson .............. H01M 8/0491 320/101
9,174,546 B2 * 11/2015 Hatanaka ................ B60L 11/16
(Continued)

FOREIGN PATENT DOCUMENTS

CN 101376344 A 3/2009
DE 102010034441 A1 10/2011
(Continued)

OTHER PUBLICATIONS

Hamid et al: "Bidirectional DC-DC Converters for Energy Storage Systems", Published: Sep. 22, 2011 pp. 160-179.
(Continued)

*Primary Examiner* — Zachary L Kuhfuss
(74) *Attorney, Agent, or Firm* — Whitmyer IP Group LLC

(57) ABSTRACT

A converter system for electrically driving a vehicle, including a grid-side converter, a DC link with at least a first and second potential conductors, and a motor-side converter. The motor-side converter allows a bidirectional flow of energy. The grid-side converter has a single phase on the input side and is connected to a supply grid. The grid-side converter is unidirectional and allows a flow of energy from the supply grid into the DC link. The DC link connects the grid-side converter to the motor-side converter and has a first electrical energy storage between the first and second potential conductors. The electrical energy storage is connected to the DC link via an electrical connection. The flow of energy from the DC link into the further electrical energy storage and the flow of energy from the further electrical energy storage into the DC link is able to be controlled.

18 Claims, 2 Drawing Sheets

32 10 34 35 20 30 31 24 26 M 34 28 22 39 38 40 36

(51) Int. Cl.
*H02M 7/49* (2007.01)
*B60L 50/50* (2019.01)
*B60L 50/53* (2019.01)
*B60L 50/40* (2019.01)

(52) U.S. Cl.
CPC ................ *B60M 3/00* (2013.01); *H02M 7/49* (2013.01); *B60L 2200/26* (2013.01); *B60L 2210/30* (2013.01); *Y02T 10/7005* (2013.01); *Y02T 10/7241* (2013.01)

(56) References Cited

U.S. PATENT DOCUMENTS

| | | | | |
|---|---|---|---|---|
| 9,260,022 | B2 * | 2/2016 | Yang | B60L 11/1816 |
| 9,434,259 | B2 * | 9/2016 | Kitanaka | B60L 11/005 |
| 9,469,204 | B2 * | 10/2016 | Gati | H02J 7/022 |
| 9,571,000 | B2 * | 2/2017 | Ronner | H02M 5/458 |
| 9,764,647 | B2 * | 9/2017 | Matsuda | B60L 7/14 |
| 2008/0036427 | A1 * | 2/2008 | Hiraki | B60L 9/005<br>320/166 |
| 2012/0019190 | A1 | 1/2012 | Jones et al. | |
| 2017/0036549 | A1 * | 2/2017 | Sugahara | B60L 1/00 |
| 2017/0158057 | A1 * | 6/2017 | Otani | B60L 3/0023 |

FOREIGN PATENT DOCUMENTS

| | | | | |
|---|---|---|---|---|
| DE | 102010039640 | A1 | 2/2012 | |
| DE | 102010044322 | A1 | 3/2012 | |
| EP | 1288060 | A1 | 3/2003 | |
| EP | 2728735 | A2 | 5/2014 | |
| EP | 2728735 | A3 | 11/2014 | |
| EP | 2599656 | A4 * | 7/2017 | B60L 9/22 |
| EP | 2570292 | A4 * | 10/2017 | B60L 1/00 |
| JP | 2000197369 | A | 7/2000 | |
| JP | 2007104899 | A | 4/2007 | |
| RU | 2491702 | C2 | 8/2013 | |
| WO | 2014041192 | A1 | 3/2014 | |

OTHER PUBLICATIONS

ABB Technik: "Traction Transformation a power-electronic traction transformer (PETT)", ISSN 1013-3119 Copyright: 2012 pp. 11-17.

Chinese Office Action and Translation Application No. 201510805007 dated Aug. 23, 2019 10 pages.

* cited by examiner

CONVERTER SYSTEM FOR ELECTRICALLY DRIVING A VEHICLE

FIELD OF THE INVENTION

The present invention relates to the field of converter systems for electrically driving a vehicle, in particular to converter systems. The present invention also relates to an electrical vehicle having a converter system.

BACKGROUND OF THE INVENTION

Such converter systems are well known to a person skilled in the art and have, in particular, a grid-side converter, a DC link and a motor-side converter, the grid-side converter being connected to a supply grid and the motor-side converter being connected to an electrical machine for driving a vehicle. In order to make it possible to drive the vehicle in an energy-efficient manner, such energy systems typically allow a bidirectional flow of energy, as a result of which the energy produced during electrical braking of the vehicle can be fed back into the supply grid, which operation is known to a person skilled in the art as recuperation of the braking energy. As a result of the recuperation possibility into the supply grid, the braking energy need not be uselessly converted into heat in braking resistors or similar systems. Such a recuperation possibility imposes specific demands on the converter system. These demands result in complicated and therefore expensive embodiments of the converter system, very particularly in the case of topologically sophisticated converter systems, for example a multilevel converter system.

SUMMARY OF THE INVENTION

The object of the invention is consequently to specify a converter system which makes it possible to recuperate the braking energy and is an alternative to the existing solutions.

According to the invention, this object is achieved by means of the converter system according to one aspect of the present invention and also by means of an electrical vehicle according to another aspect of the present invention.

According to the invention, the converter system for electrically driving a vehicle has a grid-side converter, a DC link with a first potential conductor at a first electrical potential and a second potential conductor at a second electrical potential different from the first electrical potential, and a motor-side converter, wherein the motor-side converter allows a bidirectional flow of energy, wherein the grid-side converter has a single phase on the input side and is connectable at least to a supply grid, being connected, on the output side, to the DC link and obtaining energy from the supply grid during operation, wherein the DC link connects the grid-side converter to the motor-side converter, wherein the DC link comprises a first electrical energy storage between the first potential conductor and the second potential conductor, wherein a further electrical energy storage is connected to the DC link via an electrical connection, and wherein the flow of energy into the further electrical energy storage is controllable, wherein the grid-side converter is a unidirectional converter and allows a flow of energy from the supply network into the DC link, and a flow of energy from the further electrical energy storage into the DC link is controlled.

The converter system according to the invention consequently has a further energy storage in which the energy recuperated during electrical braking, for example, can be stored and from which energy can be obtained during the next acceleration operation. This preferred embodiment of the converter system makes it possible to drive the vehicle by drawing energy from the further energy storage, for example when traveling over neutral sections or during brief interruptions in the connection between the pantograph and the catenary, and therefore allows smoother passage through such interruptions to the supply grid. This preferred embodiment also enables a simpler design of the grid-side converter without having to dispense with the use of the recuperated energy in this case.

According to one preferred embodiment of the converter system, the electrical connection of the further electrical energy storage has a further, bidirectional converter which is connected, on the one hand, to the DC link and, on the other hand, to the further energy storage.

This preferred embodiment of the converter system makes it possible to control the flow of energy into and from the further electrical energy storage in a particularly simple manner.

According to another preferred embodiment of the converter system, the rated power of the further, bidirectional converter corresponds to at least 50% of the rated power of the motor-side converter, preferably at least 80% of the rated power and particularly preferably at least 90% of the rated power.

This preferred embodiment of the converter system makes it possible to transfer most of the recuperated energy to the further energy storage. Furthermore, this preferred embodiment also makes it possible to quickly provide the energy stored in the further energy storage.

According to another preferred embodiment of the converter system, the maximum energy content of the further energy storage is dimensioned in such a manner that it can receive the rated power of the motor-side converter at least during 1 second, preferably during at least 5 seconds and particularly preferably during at least 10 seconds.

This preferred embodiment of the converter system makes it possible to store most of the recuperated braking energy even in the case of relatively long braking distances, thus making it possible to drive the vehicle in a particularly efficient manner.

According to another preferred embodiment of the converter system, the further energy storage can store at least five times the energy of the first energy storage.

This preferred embodiment of the converter system makes it possible to store most of the recuperated braking energy even in the case of relatively long braking distances, thus making it possible to drive the vehicle in a particularly efficient manner.

According to another preferred embodiment of the converter system, the grid-side converter can be connected, on the grid side, at least to an AC voltage grid and preferably also to a DC voltage grid.

This preferred embodiment of the converter system makes it possible to use the converter system with different supply grids, for example if a vehicle equipped with the converter system travels from an AC supply grid into a DC supply grid and vice versa.

According to another preferred embodiment of the converter system, the grid-side converter has at least an AC/DC converter, a DC link, a DC/AC converter, a galvanic-isolating means and a passive AC/DC converter which are arranged in a chain circuit with respect to one another.

This above-mentioned topology of the converter system, in combination with the further energy storage, enables an extremely cost-effective design of a unidirectional grid-side converter, whereas the recuperated energy can be buffered in the further energy storage. In addition, the passive AC/DC converter makes it possible to easily control the grid-side converter.

According to another preferred embodiment of the converter system, the grid-side converter is a modular converter consisting of at least two converter cells, each converter cell having at least an AC/DC converter, a DC link, a DC/AC converter, a galvanic-isolating means and a passive AC/DC converter which are connected in series with one another on the input side and are connected parallel to one another on the output side.

As a result of the series connection of a sufficient number of cells on the supply grid side, this preferred embodiment of the converter system makes it possible to connect the converter to a high-voltage supply grid without having to depend on a conventional railway transformer in this case. Furthermore, this embodiment makes it possible to easily form redundancy in the grid-side converter. Another advantage of this embodiment is that each module can be switched independently. This makes it possible to control the mains current in a particularly advantageous manner.

Furthermore, in combination with the further energy storage, this topology of the converter system enables an extremely cost-effective design of a unidirectional grid-side converter, whereas the recuperated energy can be buffered in the further energy storage. In addition, the passive AC/DC converter makes it possible to easily control the grid-side converter.

According to another preferred embodiment of the converter system, the DC/AC converter operates in a series-resonant manner.

According to another preferred embodiment of the converter system, the grid-side converter is a passive diode rectifier.

This preferred embodiment of the converter system enables an extremely cost-effective and simple design of the grid-side converter.

Further preferred embodiments of the invention are stated in the further dependent patent claims and emerge from the description of the preferred embodiments and exemplary embodiments.

Preferred embodiments of the present invention are described in an exemplary manner with reference to the attached drawings. These preferred embodiments of the invention are non-restrictive examples of the invention.

DETAILED DESCRIPTION OF THE INVENTION

Figure 1:
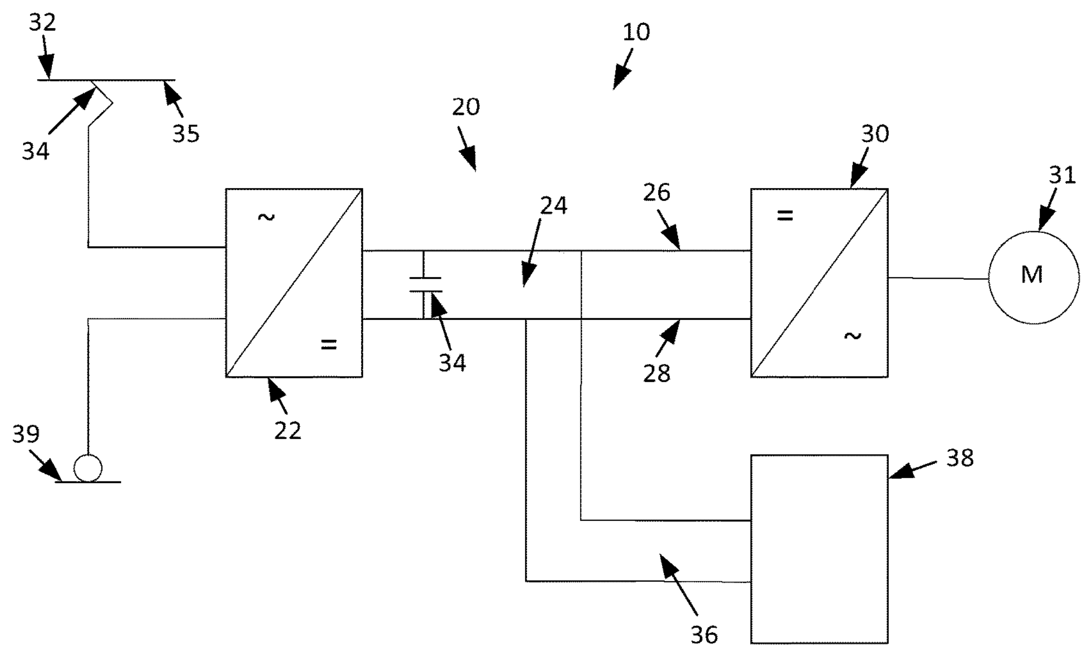
FIG. 1 purely schematically shows a first exemplary embodiment of a rail vehicle according to the invention and of a converter system according to the invention.

FIG. 1 shows an exemplary embodiment of an electrical rail vehicle 10 according to the invention and of a converter system 20 according to the invention. Rail vehicles are track-guided vehicles such as trains, locomotives and underground railways with conventional metal wheels as well as tires filled with air or the like. Further vehicle types are known to a person skilled in the art. The converter system according to the invention can also be used for electrical vehicles which are not track-guided, for example trolley buses.

The converter system 20 intended to electrically drive the rail vehicle 10 has a grid-side converter 22 and a DC link 24 with a first potential conductor 26 and a second potential conductor 28. The converter system 20 also has a motor-side converter 30, wherein the motor-side converter 30 allows a bidirectional flow of energy and is connected to one electrical machine 31 or to a plurality of electrical machines 31. The electrical machine(s) 31 is/are intended to drive the wheels of the rail vehicle 10.

It is also advantageous if the rated power of the motor-side converter 30 is matched to the rated power of the electrical machine(s) 31 connected to the motor-side converter 30.

Instead of the described embodiment of the DC link 24, the latter may also have more than two potentials, the design of the DC link being matched to the topology of the grid-side converter and of the motor-side converter. Such multilevel converter topologies are known to a person skilled in the art.

The term "bidirectional flow of energy" means that the energy can flow from the DC link 24, through the motor-side converter 30, into the electrical machine 31 and that the energy can also flow in the opposite direction, that is to say from the electrical machine 31, through the motor-side converter 30, into the DC link 24.

This bidirectional flow of energy is enabled, for example, by a motor-side converter 30, a three-phase motor-side converter 30 in one preferred embodiment, which consists of three identical phase modules and is known to a person skilled in the art as an active inverter. A phase module has at least two bidirectional semiconductor switches which are connected in series and have a controlled unidirectional current conduction direction. These bidirectional semiconductor switches comprise an IGBT and a diode reverse-connected in parallel with the IGBT in one preferred embodiment, this diode reverse-connected in parallel being integrated in the IGBT in one preferred embodiment. Each phase module is connected, on the input side, to the DC link 24 and, on the output side, to a phase conductor to the electrical machine 31. Each phase conductor to the electrical machine 31 can therefore be switchably connected at least to the first potential conductor 26 or to the second potential conductor 28. In a similar manner to the preferred embodiment described above, the motor-side converter 30 could also have two phases or more than three phases.

The grid-side converter 22 has a single phase on the input side and can be connected to a supply grid 32. On the output side, the converter 22 is connected to the DC link 24.

During operation or while traveling, the converter system 20 mostly obtains energy from the supply grid 32 to which it is connected, in one preferred embodiment, via a pantograph 34 and the catenary 35 and via the rail 39. This connection may be briefly interrupted, for example as a result of a jump of the pantograph 34 from the catenary 35 or by traveling over a neutral section; other reasons for an interruption are known to a person skilled in the art. However, apart from these interruptions, a continuous electrical connection between the supply grid 32 and the converter system 20 is otherwise provided while driving the rail vehicle 10.

As an alternative to an electrical connection via the pantograph 34 and the catenary 35, the connection could also be established via a further rail 39, as is conventional in underground railways, in particular.

The DC link 24 connects the grid-side converter 22 to the motor-side converter 30 and has a first electrical energy storage 34 between the first potential conductor 26 and the second potential conductor 28. A further electrical energy storage 38 is connected to the potential conductors 26, 28, that is to say to the first potential conductor 26 and to the second potential conductor 28, via an electrical connection 36. The flow of energy into the further electrical energy storage 38 is bidirectional and is controllable both in terms of magnitude and in terms of direction. In other words, the flow of energy from the DC link into the further electrical energy storage and the flow of energy from the further electrical energy storage into the DC link is controllable.

The first energy storage 34 is typically formed by one capacitor or by a plurality of capacitors.

Figure 2:
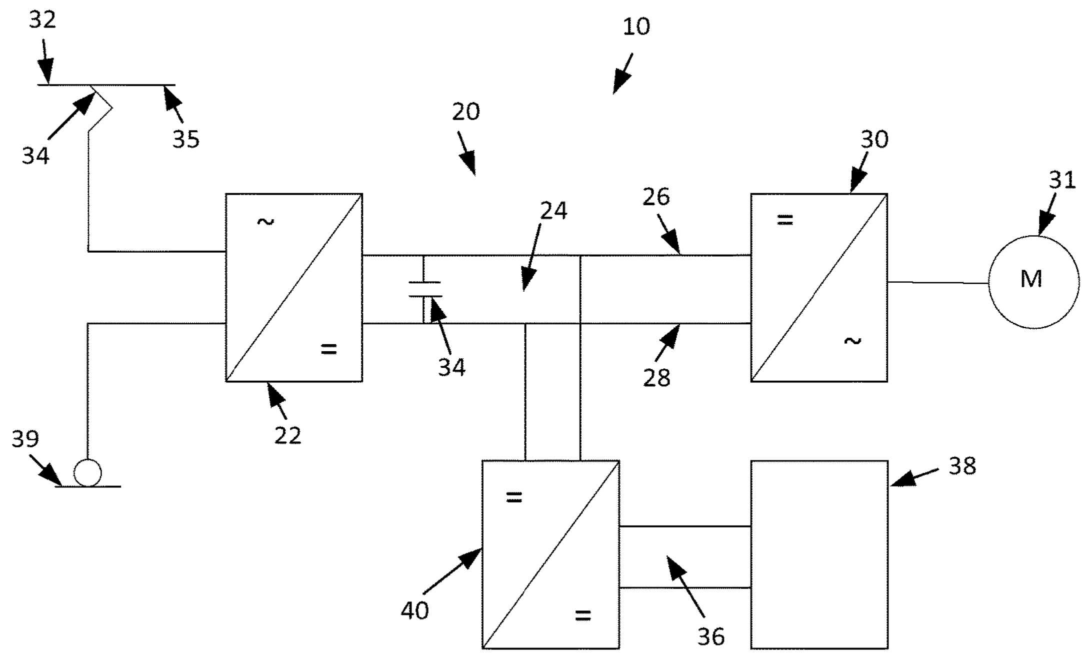
FIG. 2 purely schematically shows a second exemplary embodiment of a rail vehicle according to the invention and of a converter system according to the invention.

In an embodiment shown in FIG. 2, the electrical connection 36 comprises a further, bidirectional converter 40 which is connected, on the one hand, to the DC link 24 and, on the other hand, to the further electrical energy storage 38. The further, bidirectional converter 40 is therefore designed in such a manner that the direction and magnitude of the flow of energy between the DC link 24 and the further electrical energy storage 38 is controllable. In one preferred embodiment, the rated power of the further, bidirectional converter 40 corresponds to at least 50% of the rated power of the motor-side converter 30. In another preferred embodiment, the rated power of the further, bidirectional converter 40 corresponds to at least 80% of the rated power of the motor-side converter 30 and, in a further particularly preferred embodiment, the rated power of the further, bidirectional converter 40 corresponds to at least 90% of the rated power of the motor-side converter 30.

The further electrical energy storage 38 is typically at least one battery and/or a supercapacitor or else another known electrical energy storage. The maximum energy content of the further electrical energy storage 38 is dimensioned such that it can receive the rated power of the motor-side converter 30 at least during 1 second, preferably during at least 5 seconds and particularly preferably during at least 10 seconds.

In one preferred embodiment, the further energy storage 38 can store at least five times, preferably at least 10 times and particularly preferably at least 15 times the energy of the first energy storage 34.

The grid-side converter 22 is a unidirectional converter since it contains at least one passive subelement and therefore solely allows the flow of energy in one direction on account of the structure.

The term "unidirectional flow of energy" denotes the flow of energy from the supply grid 32, through the grid-side converter 22, into the DC link 24 and excludes a possible flow of energy in the opposite direction, that is to say from the DC link 24, through the grid-side converter 22, to the supply grid 32, on account of the structure.

Figure 3:
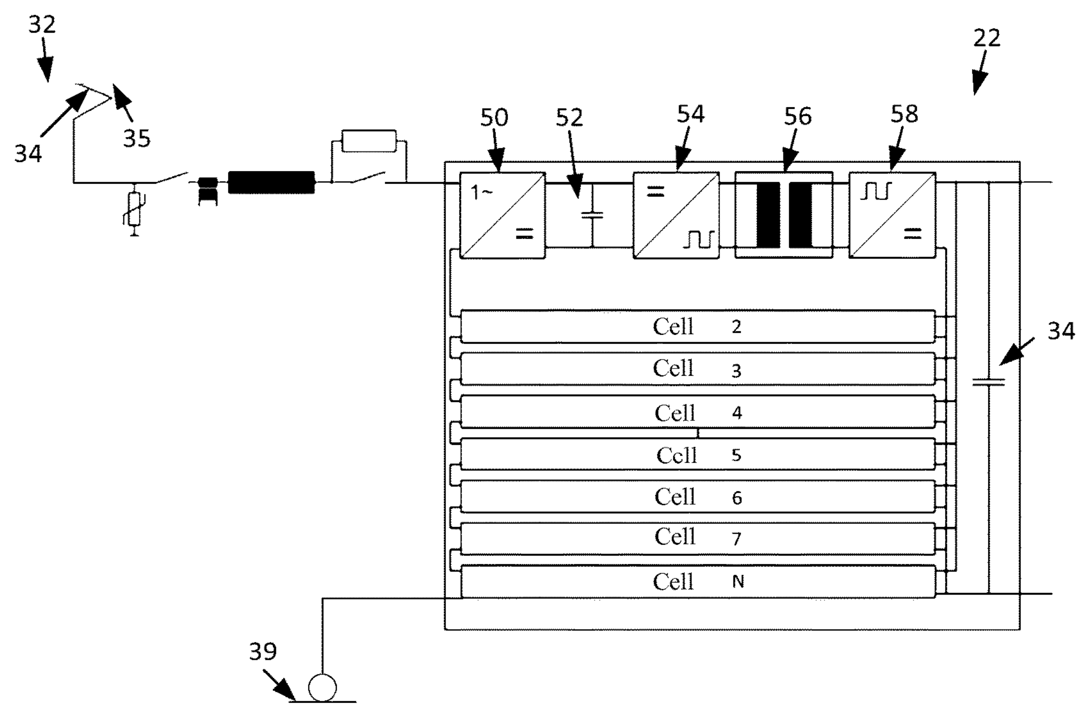
FIG. 3 purely schematically shows an exemplary embodiment of a grid-side converter for one of the exemplary embodiments.

FIG. 3 shows an exemplary embodiment of a unidirectional grid-side converter 22 of the converter system 20.

The grid-side converter 22 is a modular converter consisting of a plurality of cells, cell 1 to cell N, whereas N may be any arbitary natural number. The converter cells are connected in series with one another on the input side and are connected parallel to one another on the output side.

The number N of converter cells depends on the electric strength of the individual cells and the maximum voltage of the supply grid 32 and possibly redundancy criteria.

In one preferred embodiment, each of the cells has an AC/DC converter 50, a DC link 52, a DC/AC converter 54, a galvanic-isolating means 56 and a passive AC/DC converter 58 which are arranged in a chain circuit with respect to one another.

A similar topology is known to a person skilled in the art, for example, from ABB technik 1|12, pages 11 to 17, ISSN 1013-3119.

In one preferred embodiment, the first AC/DC converter 50, as seen from the supply grid 32, is active, as a result of which the mains current is controllable.

In another preferred embodiment, the DC/AC converter of the grid-side converter 22 operates in a series-resonant manner.

The DC/AC converter operating in a series-resonant manner is typically based on the use of an LLC resonant circuit which is formed by the leakage and magnetization inductances of the galvanic-isolating means and an additionally fitted capacitor. Such series-resonant DC/AC converters and their possible embodiment are known to a person skilled in the art, likewise see, for example, ABB technik 1|12, pages 11 to 17, ISSN 1013-3119.

In one preferred embodiment, for example in the embodiment shown in FIG. 3, the grid-side converter 22 of the converter system 20 can be connected at least to an AC voltage grid and, in one particularly preferred embodiment, to an AC voltage grid and to a DC voltage grid. In the case of an AC voltage grid, the grid-side converter 22 assumes the function of a rectifier. If the supply grid is a DC voltage grid, the grid-side converter 22 operates as a DC/DC converter, that is to say as the coupling between the DC voltage grid and the DC link, possibly with different DC voltage values.

The grid-side converter 22 shown in FIG. 3 allows the converter system to be used with different supply grid voltage values of the AC voltage supply grid and the DC voltage supply grid.

In another embodiment, the grid-side converter 22 is a passive diode rectifier, in particular a multi-pulse rectifier, a bridge rectifier or a half-wave rectifier. Further rectifier types which can be used are known to a person skilled in the art.

What is claimed is:

1. A converter system for electrically driving a vehicle, comprising:

a grid-side converter, a DC link with a first potential conductor at a first electrical potential and a second potential conductor at a second electrical potential different from the first electrical potential, and a motor-side converter, wherein the motor-side converter allows a bidirectional flow of energy from the DC link through the motor-side converter into an electrical machine and from the electrical machine through the motor-side converter into the DC link, wherein the grid-side converter has a single phase on an input side, is connectable on the input side to a supply grid, is connectable on an output side to the DC link, and obtains energy from the supply grid during operation, wherein the DC link connects the grid-side converter to the motor-side converter, wherein the DC link comprises a first electrical energy storage between the first potential conductor and the second potential conductor, wherein a further electrical energy storage is connected to the DC link via an electrical connection, wherein a flow of energy from the DC link into the further electrical energy storage is controllable, wherein the grid-side converter is a unidirectional converter and allows a flow of energy from the supply grid into the DC link, and a flow of energy from the further electrical energy storage into the DC link is controllable, and wherein the grid-side converter has at least an AC/DC converter, a DC link, a DC/AC converter, a galvanic-isolating means, and a passive AC/DC converter which are arranged in a chain circuit with respect to one another, wherein the electrical connection has a further, bidirectional converter which is connected, on the one hand, to the DC link and, on the other hand, to the further electrical energy storage, and a rated power of the further, bidirectional converter corresponds to at least 50% of a rated power of the motor-side converter.

2. The converter system as claimed in claim 1, wherein a maximum energy content of the further electrical energy storage is dimensioned so that the further electrical energy storage is adapted to receive the rated power of the motor-side converter at least during 1 second.

3. The converter system as claimed in claim 2, wherein the maximum energy content of the further electrical energy storage is dimensioned so that the further electrical energy storage is adapted to receive the rated power of the motor-side converter at least 5 seconds.

4. The converter system as claimed in claim 1, wherein the further electrical energy storage is adapted to store at least five times the energy of the first electrical energy storage.

5. The converter system as claimed in claim 4, wherein the further electrical energy storage is adapted to store at least ten times the energy of the first electrical energy storage.

6. The converter system as claimed in claim 1, wherein the first electrical energy storage has at least one capacitor.

7. The converter system as claimed in claim 1, wherein the input side of the grid-side converter is connectable to at least to an AC voltage grid.

8. The converter system as claimed in claim 7, wherein the input side of the grid-side converter is also connectable to a DC voltage grid.

9. The converter system as claimed in claim 1, wherein the grid-side converter is a modular converter which includes at least two converter cells, wherein each converter cell has at least an AC/DC converter, a DC link, a DC/AC converter, a galvanic-isolating means, and a passive AC/DC converter which are connected in series with one another on the input side and are connected parallel to one another on the output side.

10. The converter system as claimed in claim 9, wherein the AC/DC converter, as seen from the supply grid, is active.

11. The converter system as claimed in claim 1, wherein the AC/DC converter, as seen from the supply grid, is active.

12. The converter system as claimed in claim 1, wherein the DC/AC converter operates in a series-resonant manner.

13. The converter system as claimed in claim 1, wherein the grid-side converter is a passive diode rectifier.

14. The converter system as claimed in claim 1, wherein the rated power of the further, bidirectional converter corresponds to at least 80% of the rated power of the motor-side converter.

15. An electric vehicle which obtains energy from a supply grid during travel, comprising:

a converter system including:

a grid-side converter, a DC link with a first potential conductor at a first electrical potential and a second potential conductor at a second electrical potential different from the first electrical potential, and a motor-side converter, wherein the motor-side converter allows a bidirectional flow of energy from the DC link through the motor-side converter into an electrical machine and from the electrical machine through the motor-side converter into the DC link, wherein the grid-side converter has a single phase on an input side, is connectable on the input side to a supply grid, is connectable on an output side to the DC link, and obtains energy from the supply grid during operation, wherein the DC link connects the grid-side converter to the motor-side converter, wherein the DC link comprises a first electrical energy storage between the first potential conductor and the second potential conductor, wherein a further electrical energy storage is connected to the DC link via an electrical connection, wherein a flow of energy from the DC link into the further electrical energy storage is controllable, wherein the grid-side converter is a unidirectional converter and allows a flow of energy from the supply grid into the DC link, and a flow of energy from the further electrical energy storage into the DC link is controllable, and wherein the grid-side converter has at least an AC/DC converter, a DC link, a DC/AC converter, a galvanic-isolating means, and a passive AC/DC converter which are arranged in a chain circuit with respect to one another;

wherein the motor-side converter is connected to at least one electrical machine for driving the electric vehicle, and wherein the electrical connection has a further, bidirectional converter which is connected, on the one hand, to the DC link and, on the other hand, to the further electrical energy storage, and a rated power of the further, bidirectional converter corresponds to at least 50% of a rated power of the motor-side converter.

16. The electric vehicle as claimed in claim 15, wherein a rated power of the at least one electrical machine is matched to a rated power of the motor-side converter.

17. The electric vehicle as claimed in claim 16, wherein the electric vehicle is track-guided.

18. The electric vehicle as claimed in claim 15, wherein the electric vehicle is track-guided.

* * * * *